United States Patent
Lee et al.

(10) Patent No.: US 11,702,032 B2
(45) Date of Patent: Jul. 18, 2023

(54) VEHICULAR BELT TACTILE APPARATUS AND METHOD OF CONTROLLING THE SAME

(71) Applicants: Hyundai Motor Company, Seoul (KR); Kia Corporation, Seoul (KR)

(72) Inventors: Jin Mo Lee, Gyeonggi-do (KR); Jung Keun Yoo, Gyeonggi-do (KR); Joong Kwan Kim, Gyeonggi-do (KR); Kaang Dok Yee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/404,421

(22) Filed: Aug. 17, 2021

(65) Prior Publication Data
US 2022/0203928 A1 Jun. 30, 2022

(30) Foreign Application Priority Data
Dec. 29, 2020 (KR) .......................... 10-2020-0185988

(51) Int. Cl.
*B60R 22/28* (2006.01)
*B60R 22/12* (2006.01)

(52) U.S. Cl.
CPC .............. *B60R 22/28* (2013.01); *B60R 22/12* (2013.01); *B60R 2022/282* (2013.01); *B60R 2022/288* (2013.01)

(58) Field of Classification Search
CPC ... B60R 22/28; B60R 22/12; B60R 2022/282; B60R 2022/288; B60R 22/341; B60R 22/00; B60R 21/18

USPC ................................................... 280/805, 733
See application file for complete search history.

(56) References Cited

U.S. PATENT DOCUMENTS 3,888,503 A * 6/1975 Hamilton ................ B60R 21/18
280/808
3,929,348 A * 12/1975 Lawwill .................. B60R 21/18
280/805
3,933,370 A * 1/1976 Abe ........................ B60R 21/18
297/471

(Continued)

FOREIGN PATENT DOCUMENTS

CN 107757547 A * 3/2018
GB 2405840 A * 3/2005 ............. B60R 21/18
JP 2001213256 A * 8/2001

OTHER PUBLICATIONS

Ceng CN107757547A Foreign Patent Document and English Translation Aug. 19, 2022 (Year: 2018).*

(Continued)

*Primary Examiner* — Paul N Dickson
*Assistant Examiner* — Caitlin Anne Miller
(74) *Attorney, Agent, or Firm* — Fox Rothschild LLP

(57) ABSTRACT

A vehicular belt tactile apparatus is provided. The apparatus includes a buckle, a belt configured to be fastened to the buckle and at least one air pouch disposed at a portion of the belt that contacts the body of an occupant when the belt is fastened to the buckle. An air controller generates a control signal when the belt is fastened to the buckle. The buckle includes an air supply unit that is configured to inject air into the at least one air pouch through the belt or to discharge air from the at least one air pouch in response to the control signal.

8 Claims, 8 Drawing Sheets

(56) References Cited

U.S. PATENT DOCUMENTS

| | | | | |
|---|---|---|---|---|
| 5,393,091 A | * | 2/1995 | Tanaka | B60R 21/18 |
| | | | | 280/808 |
| RE36,661 E | * | 4/2000 | Tanaka | G01M 3/3218 |
| | | | | 280/733 |
| 10,940,820 B2 | * | 3/2021 | Jaradi | B60R 21/26 |
| 2009/0051150 A1 | * | 2/2009 | Murakami | B60R 21/18 |
| | | | | 280/805 |
| 2012/0319386 A1 | * | 12/2012 | Bahr | B60R 21/268 |
| | | | | 280/736 |

OTHER PUBLICATIONS

Ochiai F JP2001213256A Foreign Patent Document and English Translation Aug. 19, 2022 (Year: 2001).*
U.S. Appl. No. 63/038,855, filed Jun. 14, 2020.

\* cited by examiner

FIG. 5A
FIG. 5B
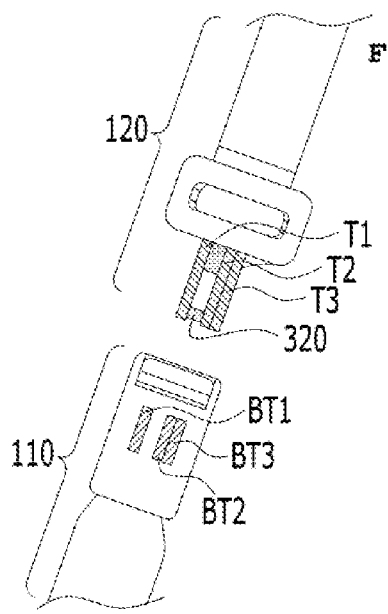
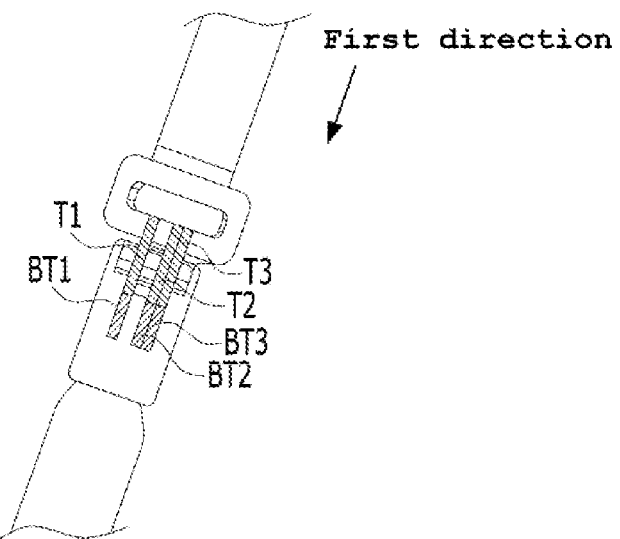
FIG. 6A
FIG. 6B
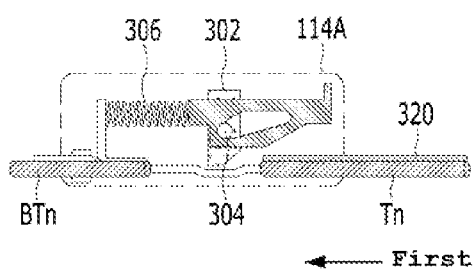
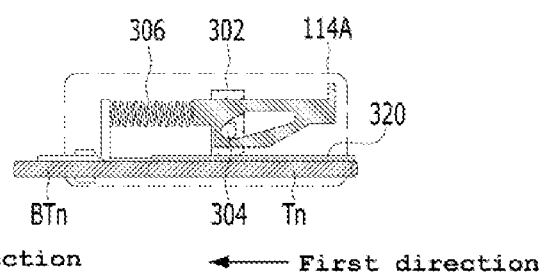

FIG. 7A
FIG. 7B
FIG. 7C
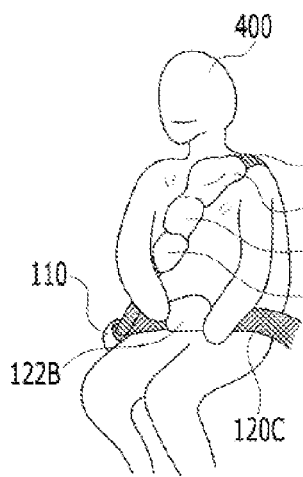
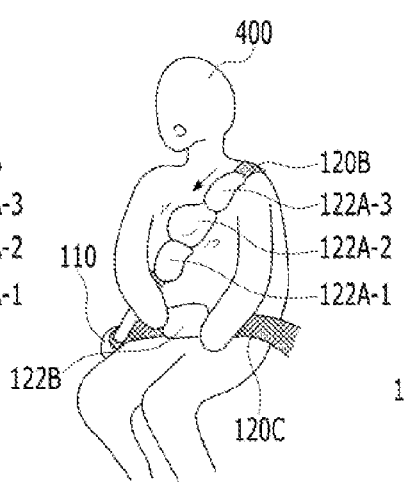
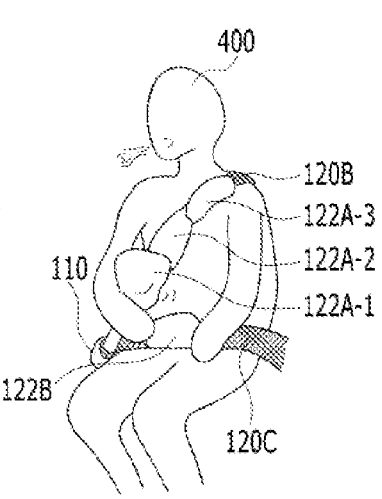

VEHICULAR BELT TACTILE APPARATUS AND METHOD OF CONTROLLING THE SAME

CROSS-REFERENCE TO RELATED APPLICATION(S)

This application claims the benefit of Korean Patent Application No. 10-2020-0185988, filed on Dec. 29, 2020, which is hereby incorporated by reference as if fully set forth herein.

BACKGROUND

Field of the Disclosure

The present disclosure relates to a vehicular belt tactile apparatus and a method of controlling the same.

Discussion of the Related Art

In general, vehicles or airplanes are equipped with seat belts to protect occupants from impact in the event of an accident. A seat belt includes a belt and a buckle, and the belt is fastened to the buckle to secure an occupant to a seat. Various research is being conducted to improve the wearing comfort of a belt of a seat belt, which comes into contact with an occupant.

SUMMARY

Accordingly, the present disclosure is directed to a vehicular belt tactile apparatus and a method of controlling the same that substantially obviate one or more problems due to limitations and disadvantages of the related art. The present disclosure provides an improved vehicular belt tactile apparatus and a method of controlling the same. However, the objects to be accomplished by the embodiments are not limited to the above-mentioned objects, and other objects not mentioned herein will be clearly understood by those skilled in the art from the following description.

A vehicular belt tactile apparatus according to an exemplary embodiment may include a buckle, a belt configured to be fastened to the buckle, at least one air pouch disposed at a portion of the belt that contacts the body of an occupant when the belt is fastened to the buckle, and an air controller configured to generate a control signal when the belt is fastened to the buckle. The buckle may include an air supply unit configured to inject air into the at least one air pouch through the belt or to discharge air from the at least one air pouch in response to the control signal.

For example, the air supply unit may include a hydraulic buckle tube connected to the belt, an air valve configured to inject air into the hydraulic buckle tube or to discharge air from the hydraulic buckle tube in response to selection signals, and an air pump configured to pump and supply required air to the air valve. The air controller may be configured to determine whether inflation or deflation of the at least one air pouch is required, generate the selection signals in response to the result of determination, and drive the air pump.

The belt may include a hydraulic belt tube having a first end portion, communicating with the hydraulic buckle tube when fastened to the buckle, and a second end portion, communicating with the at least one air pouch. The air valve may include a first air valve configured to inject air into the hydraulic buckle tube or to receive air discharged from the hydraulic buckle tube in response to a first selection signal, which is one of the selection signals, a second air valve configured to supply air pumped by the air pump to the first air valve or to discharge the pumped air to the outside in response to a second selection signal, which is another one of the selection signals, and a third air valve configured to suction external air and supply the external air to the air pump or to supply air discharged from the first air valve to the air pump in response to a third selection signal, which is still another one of the selection signals.

Additionally, each of the first air valve, the second air valve, and the third air valve may be a solenoid valve. For example, the at least one air pouch may include first to $N^{th}$ (where N is a positive integer of 2 or more) air pouches arranged in the longitudinal direction of the belt. The hydraulic buckle tube may include first to $N^{th}$ hydraulic buckle tubes, and the hydraulic belt tube may include first to $N^{th}$ hydraulic belt tubes. The first air valve may include $1\text{-}1^{st}$ to $1\text{-}N^{th}$ air valves. The $n^{th}$ ($1 \leq n \leq N$) hydraulic belt tube may be disposed between the $n^{th}$ hydraulic buckle tube and the $n^{th}$ air pouch, and the $1\text{-}n^{th}$ air valve may be connected to each of the $n^{th}$ hydraulic buckle tube, the second air valve, and the third air valve.

The air controller may be configured to generate the first to third selection signals so that the first to $N^{th}$ air pouches inflate or deflate in a predetermined order. The air controller may be configured to generate the first to third selection signals to guide control of the heart rate of the occupant. The vehicular belt tactile apparatus may further include a sensor configured to sense engagement or disengagement of the belt and the buckle, and the air controller may be configured to generate the control signal in response to the result of sensing by the sensor.

According to another exemplary embodiment, a method of controlling a vehicular belt tactile apparatus, which includes a buckle including an air supply unit, a belt configured to be fastened to the buckle, and at least one air pouch disposed at a portion of the belt that contacts the body of an occupant when the belt is fastened to the buckle, may include: determining whether the belt has been fastened to the buckle; in response to determining that the belt has been fastened to the buckle, injecting air into the at least one air pouch from the air supply unit through the belt to inflate the at least one air pouch; determining whether deflation of the at least one air pouch is required; and in response to determining that deflation of the at least one air pouch is required, discharging air discharged from the at least one air pouch via the belt to the outside through the air supply unit to deflate the at least one air pouch.

BRIEF DESCRIPTION OF THE DRAWINGS

Arrangements and embodiments may be described in detail with reference to the following drawings, in which like reference numerals refer to like elements and wherein:

FIGS. 5A-5B are plan views showing a buckle and a belt before and after engagement thereof, respectively;

FIGS. 6A-6B are cross-sectional views showing the buckle and the belt before and after engagement thereof, respectively;

FIGS. 7A-7C are views illustrating the state in which the buckle and the belt are engaged with each other to secure an occupant;

DETAILED DESCRIPTION

The present disclosure will now be described more fully hereinafter with reference to the accompanying drawings, in which various exemplary embodiments are shown. The examples, however, may be embodied in many different forms, and should not be construed as being limited to the exemplary embodiments set forth herein. Rather, these exemplary embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present. When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
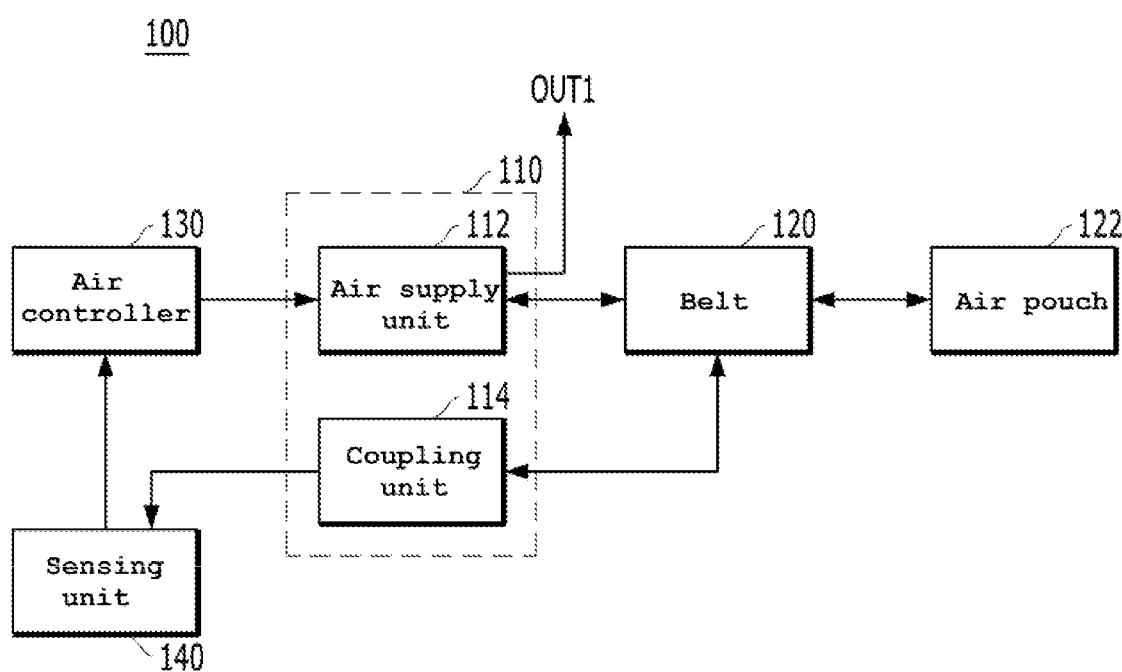
FIG. 1 is a block diagram of a vehicular belt tactile apparatus according to an exemplary embodiment.

Hereinafter, a vehicular belt tactile apparatus 100 according to an exemplary embodiment will be described with reference to the accompanying drawings. FIG. 1 is a block diagram of the vehicular belt tactile apparatus 100 according to the exemplary embodiment.

The vehicular belt tactile apparatus 100 according to the exemplary embodiment may include a buckle 110, a belt 120, an air pouch 122, and an air controller 130. In addition, the vehicular belt tactile apparatus 100 according to the exemplary embodiment may further include a sensing unit 140.

A seat belt serves to protect an occupant from impact in the event of a vehicle accident. The seat belt may include a buckle 110 and a belt 120, and the buckle 110 and the belt 120 may be engaged with each other to secure the occupant to a seat, thereby protecting the occupant. In other words, the belt 120 may be fastened to the buckle 110. The buckle 110 may include an air supply unit 112 and a coupling unit 114.

The air supply unit 112 may be configured to inject air into the air pouch 122 through the belt 120 in response to a control signal. Alternatively, the air supply unit 112 may be configured to receive the air discharged from the air pouch 122 through the belt 120 in response to a control signal, and discharge the air through an output terminal OUT1. The air pouch 122 may be disposed at a portion of the belt 120 that contacts the occupant's body when the belt 120 is fastened to the buckle 110.

As described above, to facilitate inflation and deflation thereof, the air pouch 122 may be made of an elastic material, for example, silicon, but the exemplary embodiment is not limited to any specific material of the air pouch 122. The coupling unit 114 may be configured to be engaged with the belt 120. An example of the coupling unit 114 will be described later with reference to FIGS. 6A-6B.

The air controller 130 may be configured to generate a control signal depending on engagement or disengagement of the belt 120 and the buckle 110 or in response to preset data, and output the generated control signal to the air supply unit 112. For example, when the air pouch 122 is plural in number, as shown in Table 1 to be described later, the data used to generate a control signal may include information about the sequence in which the plurality of air pouches 122 is inflated or deflated.

The sensing unit 140 may be configured to sense engagement or disengagement of the belt 120 and the buckle 110, and output the result of sensing to the air controller 130. At this time, the air controller 130 may be configured to generate a control signal in response to the result of sensing by the sensing unit 140. For example, the coupling unit 114 may be configured to output a signal indicating engagement with or disengagement from the belt 120 to the sensing unit 140. Thus, the sensing unit 140 may be configured to output the signal received from the coupling unit 114 to the air controller 130 as the result of sensing. Alternatively, the sensing unit 140 may be configured to directly check engagement or disengagement of the belt 120 and the buckle 110 without the aid of the coupling unit 114.

Although it is illustrated in FIG. 1 that the sensing unit 140 is a component of the vehicular belt tactile apparatus 100 according to the exemplary embodiment, the exemplary embodiment is not limited thereto. In other words, according to another exemplary embodiment, the sensing unit 140 may not be a component of the vehicular belt tactile apparatus 100. In general, when an occupant enters a vehicle, a sensing module (not shown), configured to determine whether the occupant has fastened a seat belt and transmit the result of determination to a main controller (not shown) of the vehicle, may perform the role of the sensing unit 140 shown in FIG. 1. In response to determining that the occupant has not fastened the seat belt based on the result of sensing by the sensing module, the main controller may be configured to visually, audibly, or tactually notify the occupant of the same. Since this is well-known technology, a detailed description thereof will be omitted.

Figure 2:
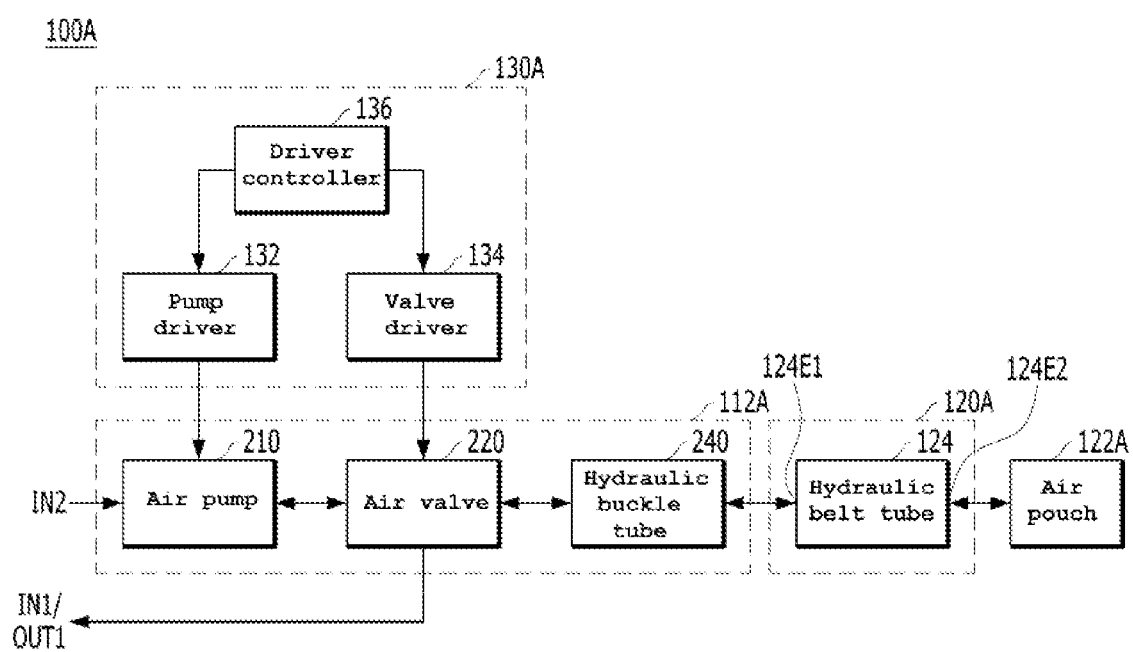
FIG. 2 is a block diagram of an exemplary embodiment of the vehicular belt tactile apparatus shown in FIG. 1.

FIG. 2 is a block diagram of an exemplary embodiment 100A of the vehicular belt tactile apparatus 100 shown in FIG. 1. For better understanding, FIG. 2 shows the state in which the belt 120A is fastened to the buckle 110. For convenience of description, the coupling unit 114 and the sensing unit 140 shown in FIG. 1 are not illustrated in FIG. 2. Further, the air supply unit 112A, the belt 120A, the air pouch 122A, and the air controller 130A shown in FIG. 2 respectively correspond to exemplary embodiments of the air supply unit 112, the belt 120, the air pouch 122, and the air controller 130 shown in FIG. 1.

Referring to FIG. 2, the air controller 130 may include a pump driver 132, a valve driver 134, and a driver controller 136. The pump driver 132 may be configured to drive an air pump 210. For example, the pump driver 132 may be configured to supply driving power for driving a motor, which is included in the air pump 210 and pump air, to the air pump 210 as the control signal described above. The valve driver 134 may be configured to transmit driving power for driving an air valve 220 to the air valve 220 as the control signal described above. In particular, each driving power may be generated in the form of direct current. For example, as will be described later with reference to FIG. 4, when the air valve 220 is implemented as a solenoid valve, the valve driver 134 may be configured to supply a driving signal for driving the solenoid valve. The driver controller 136 may be configured to operate the pump driver 132 to drive the air pump 210, and operate the valve driver 134 to drive the air valve 220.

For example, the pump driver 132 and the valve driver 134 shown in FIG. 2 may be implemented in the form of an electronic control unit (ECU) module. Referring to FIG. 2, the air supply unit 112A may include an air pump 210, an air valve 220, and a hydraulic buckle tube 240. The hydraulic buckle tube 240 may be connected to the belt 240 to form a path for injecting air into the belt 240 or receiving air flowing out of the belt 240.

In response to a selection signal, the air valve 220 may be configured to inject air introduced through an input terminal IN1 into the hydraulic buckle tube 240, or receive air discharged from the hydraulic buckle tube 240 and discharge the air to the outside through an output terminal OUT1. Particularly, the selection signal may correspond to the control signal described above. For example, in response to the selection signal, the air valve 220 may be configured to receive air discharged from the hydraulic buckle tube 240 and supply the air to the air pump 220, and the air pump 220 may be configured to pump the air to discharge the same to the outside through the air valve 220.

The air pump 210 may be configured to pump the air received from the air valve 220, and supply the pumped air to the air valve 220. Accordingly, the air pump 210 may be configured to perform a pumping operation in response to driving power supplied through an input terminal IN2. For example, the driving power may correspond to the driving power output from the pump driver 132 of the air controller 130. The air controller 130 may be configured to determine whether inflation or deflation of the air pouch 122A is required, generate a selection signal in response to the result of determination, and output the selection signal to the air valve 220. For example, the selection signal may correspond to the driving power output from the valve driver 134. The belt 120A may include a hydraulic belt tube 124. The hydraulic belt tube 124 may include an end portion 124E1, which communicates with the hydraulic buckle tube 240 when fastened to the buckle 110, and an opposite end portion 124E2, which communicates with at least one air pouch 122A.

Figure 3:
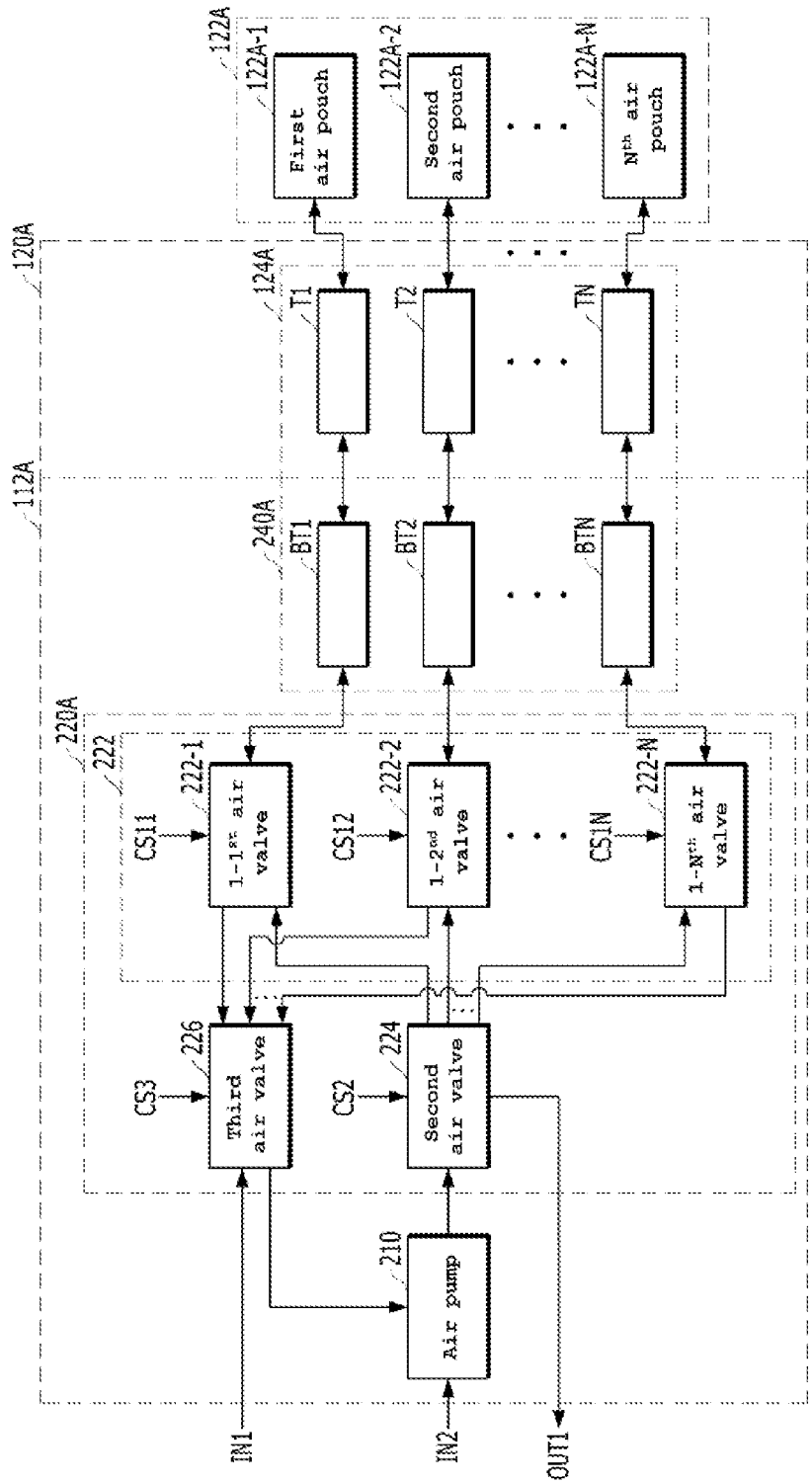
FIG. 3 is a diagram showing an exemplary embodiment of the vehicular belt tactile apparatus shown in FIG. 2.

FIG. 3 is a diagram showing an exemplary embodiment of the vehicular belt tactile apparatus 100A shown in FIG. 2. For better understanding, FIG. 3 shows the state in which the belt 120A is fastened to the buckle 110. For convenience of description, the air controller 130A shown in FIG. 2 is not illustrated in FIG. 3.

The air pump 210, the air valve 220A, the hydraulic buckle tube 240A, the hydraulic belt tube 124A, and the air pouch 122A shown in FIG. 3 respectively correspond to exemplary embodiments of and perform the same functions as the air pump 210, the air valve 220, the hydraulic buckle tube 240, the hydraulic belt tube 124, and the air pouch 122A shown in FIG. 2, and thus a duplicate description thereof will be omitted.

According to the exemplary embodiment, the air valve 220 shown in FIG. 2 may include a first air valve 222, a second air valve 224, and a third air valve 226, as shown in FIG. 3. In response to a first selection signal, which is one of the selection signals, the first air valve 222 may be configured to inject air into the hydraulic buckle tube 240A, or receive air discharged from the air pouch 122A and introduced into the hydraulic buckle tube 240A via the hydraulic belt tube 124A and supply the air to the third air valve 226.

In response to a second selection signal CS2, which is another one of the selection signals, the second air valve 224 may be configured to supply air pumped by the air pump 210 to the first air valve 222, or discharge air pumped by the air pump 210 to the outside through the output terminal OUT1. In response to a third selection signal CS3, which is still another one of the selection signals, the third air valve 226 may be configured to suction air from the outside through the input terminal IN1 and supply the air to the air pump 210.

Alternatively, the third air valve 226 may be configured to supply the air discharged from the first air valve 222 to the air pump 210 in response to the third selection signal CS3. The air pump 210 may be configured to supply the air to the second air valve 224, and the second air valve 224 may be configured to discharge the received air through the output terminal OUT1. The process of injecting air into the air pouch 122A will now be described. First, first to third selection signals may be generated by the air controller 130 and supplied to the air supply unit 112A, to perform the following operation.

The third air valve 226 may be configured to discharge air introduced from the outside through the input terminal IN1 to the air pump 210. The air pump 210 may be configured to pump the air received from the third air valve 226 and discharge the same to the second air valve 224. The second air valve 224 may be configured to receive the air pumped by the air pump 210 and discharge the same to the first air valve 222. The first air valve 222 may be configured to supply the air discharged from the second air valve 224 to the hydraulic buckle tube 240A. When the belt 120A and the buckle 110 are engaged with each other, the hydraulic buckle tube 240A may be configured to receive the air discharged from the first air valve 222 and discharge the same to the hydraulic belt tube 124A. The hydraulic belt tube 124A may be configured to supply the air discharged from the hydraulic buckle tube 240A to the air pouch 122A. Accordingly, the air pouch 122A may be inflated.

Subsequently, the air injected into the air pouch 122A to inflate the same may be discharged from the air pouch 122A, whereby the air pouch 122A is deflated. The process of deflating the air pouch 122A will now be described. First, first to third selection signals may be generated by the air controller 130 and supplied to the air supply unit 112A to perform the following operation.

The air discharged from the air pouch 122A may be supplied to the hydraulic belt tube 124A. When the belt 120A and the buckle 110 are engaged with each other, the hydraulic belt tube 124A may be configured to supply the air discharged from at least the air pouch 122A to the hydraulic buckle tube 240A. The hydraulic buckle tube 240A may be configured to supply the air introduced through the hydraulic belt tube 124A to the third air valve 226. The third air valve 226 may be configured to output the air received from the hydraulic buckle tube 240A to the air pump 210. Thereafter, the air pump 210 may be configured to supply the air received from the third air valve 226 to the second air valve 224. The second air valve 224 may be configured to discharge the air pumped by the air pump 210 through the output terminal OUT1.

The air pouch 122A shown in FIG. 3 may be one or plural in number. For example, the air pouch 122A may include first to $N^{th}$ air pouches 122A-1, 122A-2, . . . and 122A-N, which are arranged in the longitudinal direction of the belts 120 and 120A. Here, "N" may be a positive integer of 2 or more. In particular, the hydraulic buckle tube 240A may include first to $N^{th}$ hydraulic buckle tubes BT1, BT2, . . . and BTN, the hydraulic belt tube 124A may include first to $N^{th}$ hydraulic belt tubes T1, T2, . . . and TN, and the first air valve 222 may include $1\text{-}1^{st}$ to $1\text{-}N^{th}$ air valves 222-1, 222-2, . . . and 222-N.

The $n^{th}$ hydraulic belt tube Tn may be disposed between the $n^{th}$ hydraulic buckle tube BTn and the $n^{th}$ air pouch 122A-n, and the $1\text{-}n^{th}$ air valve 222-$n$ may be connected to each of the $n^{th}$ hydraulic buckle tube BTn, the second air valve 224, and the third air valve 226. Here, 1≤n≤N. That is, the air discharged from the $1\text{-}n^{th}$ air valve 222-$n$ may be injected into the $n^{th}$ air pouch 122A-n through the $n^{th}$ hydraulic buckle tube BTn and the $n^{th}$ hydraulic belt tube Tn, thereby inflating the $n^{th}$ air pouch 122A-n.

Figure 4:
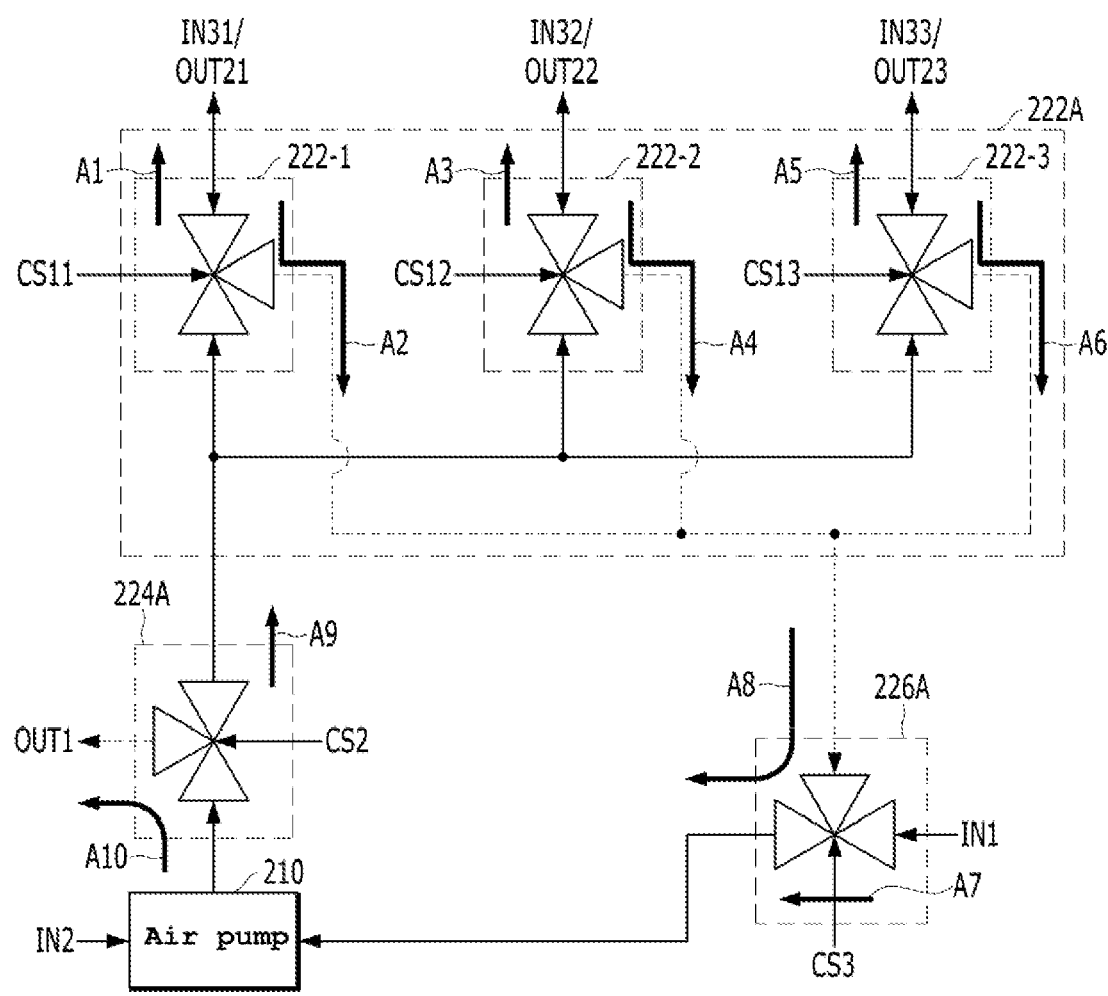
FIG. 4 shows exemplary embodiments of the air pump and the air valve shown in FIG. 3.

Hereinafter, on the assumption that "N" is 3 in the configuration shown in FIG. 3, an exemplary embodiment of the air valve 220A will be described with reference to FIG. 4. FIG. 4 shows exemplary embodiments of the air pump 210 and the air valve 220A shown in FIG. 3. The first, second and third air valves 222A, 224A and 226A shown in FIG. 4 respectively correspond to exemplary embodiments of and perform the same functions as the first, second and third air valves 222, 224 and 226 shown in FIG. 3.

In FIG. 4, the solid lines indicate flow paths through which air is supplied to the first to third hydraulic buckle tubes BT1, BT2 and BT3, and the dotted lines indicate flow paths through which the air flows after being introduced into the first to third hydraulic buckle tubes BT1, BT2 and BT3. Each of the first, second and third air valves 222, 224 and 226 shown in FIG. 3 may be a three-way solenoid valve, as shown in FIG. 4. In other words, the air valves shown in FIG. 4 may include a first solenoid valve 222A, a second solenoid valve 224A, and a third solenoid valve 226A.

The first solenoid valve 222A may include $1\text{-}1^{st}$, $1\text{-}2^{nd}$ and $1\text{-}3^{rd}$ solenoid valves 222-1, 222-2 and 222-3. The $1\text{-}1^{st}$ solenoid valve 222-1 may be configured to receive air discharged from the second solenoid valve 224, and discharge the received air to the first hydraulic buckle tube BT1 through the output terminal OUT21 in the direction of the arrow A1. Alternatively, the $1\text{-}1^{st}$ solenoid valve 222-1 may be configured to discharge the air introduced from the first hydraulic buckle tube BT1 through the input terminal IN31 to the third solenoid valve 226A in the direction of the arrow A2.

The $1\text{-}2^{nd}$ solenoid valve 222-2 may be configured to receive air discharged from the second solenoid valve 224, and discharge the received air to the second hydraulic buckle tube BT2 through the output terminal OUT22 in the direction of the arrow A3. Alternatively, the $1\text{-}2^{nd}$ solenoid valve 222-2 may be configured to discharge the air introduced from the second hydraulic buckle tube BT2 through the input terminal IN32 to the third solenoid valve 226A in the direction of the arrow A4.

The $1\text{-}3^{rd}$ solenoid valve 222-3 may be configured to receive air discharged from the second solenoid valve 224, and discharge the received air to the third hydraulic buckle tube BT3 through the output terminal OUT23 in the direction of the arrow A5. Alternatively, the $1\text{-}3^{rd}$ solenoid valve 222-3 may be configured to discharge the air introduced from the third hydraulic buckle tube BT3 through the input terminal IN33 to the third solenoid valve 226A in the direction of the arrow A6.

The third solenoid valve 226A may be configured to discharge the air introduced through the input terminal IN1 to the air pump 210 in the direction of the arrow A7, or discharge the air introduced from the $1\text{-}1^{st}$, $1\text{-}2^{nd}$ and $1\text{-}3^{rd}$ solenoid valves 222-1, 222-2 and 222-3 in the direction of the arrows A2, A4 and A4 to the air pump 210 in the direction of the arrow A8. The second solenoid valve 224A may be configured to receive the air discharged from the air pump 210 and discharge the same to the $1\text{-}1^{st}$ to $1\text{-}3^{rd}$ solenoid valves 222-1, 222-2 and 222-3 in the direction of the arrow A9, or discharge the air to the outside through the output terminal OUT1 in the direction of the arrow A10.

As described above, the first selection signals CS11, CS12 and CS13 may be generated so that the first solenoid valves 222-1, 222-2 and 222-3 may be configured to operate corresponding thereto, the second selection signal CS2 may be generated so that the second solenoid valve 224A may operate corresponding thereto, and the third selection signal CS3 may be generated so that the third solenoid valve 226A may operate corresponding thereto. For example, in Table 1 to be described later, it is assumed that, when each of the selection signals CS11, CS12, CS13, CS2 and CS3 is "OFF", air flows in the directions of the arrows A1, A3, A5, A7 and A9 and that, when each of the selection signals CS11, CS12, CS13, CS2 and CS3 is "ON", air flows in the directions of the arrows A2, A4, A6, A8 and A10.

For example, the "OFF" state of the selection signals CS11, CS12, CS13, CS2 and CS3 may be the state in which the selection signals CS11, CS12, CS13, CS2 and CS3 are generated in a "high" logic level (or a "low" logic level), and the "ON" state of the selection signals CS11, CS12, CS13, CS2 and CS3 may be the state in which the selection signals CS11, CS12, CS13, CS2 and CS3 are generated in a "low" logic level (or a "high" logic level).

Alternatively, on the assumption that the first to third solenoid valves 222, 224 and 226 are driven in response to the selection signals CS11, CS12, CS13, CS2 and CS3, the "OFF" state of the selection signals CS11, CS12, CS13, CS2 and CS3 may be the state in which the selection signals CS11, CS12, CS13, CS2 and CS3 are supplied (or not supplied) as driving power for driving corresponding solenoid valves, and the "ON" state of the selection signals CS11, CS12, CS13, CS2 and CS3 may be the state in which the selection signals CS11, CS12, CS13, CS2 and CS3 are not supplied (or supplied) as driving power for driving corresponding solenoid valves.

For example, when the selection signals CS11, CS12, CS13, CS2 and CS3 shown in FIG. 4 are generated as shown in Table 1 below, the first to third air pouches 122A-1, 122A-2 and 122A-3 may be inflated by the injection of air thereinto, or may be deflated by the discharge of air therefrom.

TABLE 1

| Classification | CS2 | CS3 | CS11 | CS12 | CS13 |
|---|---|---|---|---|---|
| S1 | OFF | OFF | OFF | OFF | OFF |
| S2 | OFF | OFF | OFF | ON | ON |
| S3 | OFF | OFF | ON | OFF | ON |
| S4 | OFF | OFF | ON | ON | OFF |
| S5 | OFF | ON | OFF | ON | ON |
| S6 | ON | ON | ON | ON | ON |
| S7 | ON | ON | ON | OFF | OFF |
| S8 | ON | ON | OFF | ON | OFF |
| S9 | ON | ON | OFF | OFF | ON |
| S10 | OFF | ON | ON | OFF | OFF |
| S11 | ON | OFF | OFF | OFF | OFF |

In Table 1 above, the states S1 to S11 of the first to third air pouches 122A-1, 122A-2 and 122A-3 may be changed variously based on the states of the selection signals CS11, CS12, CS13, CS2 and CS3. In other words, "S1" represents the state in which all of the first to third air pouches 122A-1, 122A-2 and 122A-3 are inflated, "S2" represents the state in which the first air pouch 122A-1 is inflated, "S3" represents the state in which the second air pouch 122A-2 is inflated, "S4" represents the state in which the third air pouch 122A-3 is inflated, "S5" represents the state in which the first air pouch 122A-1 is inflated and the second and third air pouches 122A-2 and 122A-3 are deflated, "S6" represents the state in which all of the first to third air pouches 122A-1, 122A-2 and 122A-3 are deflated, "S7" represents the state in which the first air pouch 122A-1 is deflated, "S8" represents the state in which the second air pouch 122A-2 is deflated, "S9" represents the state in which the third air pouch 122A-3 is deflated, "S10" represents the state in which the first air pouch 122A-1 is deflated and the second and third air pouches 122A-2 and 122A-3 are inflated, and "S11" represents the state in which the first to third air pouches 122A-1, 122A-2 and 122A-3 are maintained in their current states.

FIGS. 5A-5B are plan views showing the buckle 110 and the belt 120 before and after engagement thereof, respectively, and FIGS. 6A-6B are cross-sectional views showing the buckle 110 and the belt 120 before and after engagement thereof, respectively. Referring to FIGS. 5A-6B, the coupling unit 114A, which is an exemplary embodiment of the coupling unit 114 shown in FIG. 1, may include a latch 302, a locking part 304, and an elastic member 306, and the belt 120 may include a latch plate 320. FIGS. 5A-6B, which show the coupling unit 114A and the latch plate 320, are views for helping understanding the embodiment. The exemplary embodiment is not limited to any specific configuration of the coupling unit 114 or any specific configuration of the part of the belt 120 that is coupled to the coupling unit 114.

The latch plate 320 in the state shown in FIGS. 5A and 6A may slide in a first direction to be inserted into the coupling unit 114A, and the locking part 304 of the latch 302 may be locked. Accordingly, as shown in FIGS. 5B and 6B, the buckle 110 and the belt 120 may be engaged with each other. The latch plate 320 may have therein a latching space (or a "latching hole"), and first to third hydraulic belt tubes T1, T2 and T3 may be disposed around the latching space in the latch plate 320. Accordingly, as shown in FIGS. 5B and 6B, when the buckle 110 and the belt 120 are engaged with each other, the first hydraulic buckle tube BT1 communicates with the first hydraulic belt tube T1, the second hydraulic buckle tube BT2 communicates with the second hydraulic belt tube T2, and the third hydraulic buckle tube BT3 communicates with the third hydraulic belt tube T3.

Figure 8:
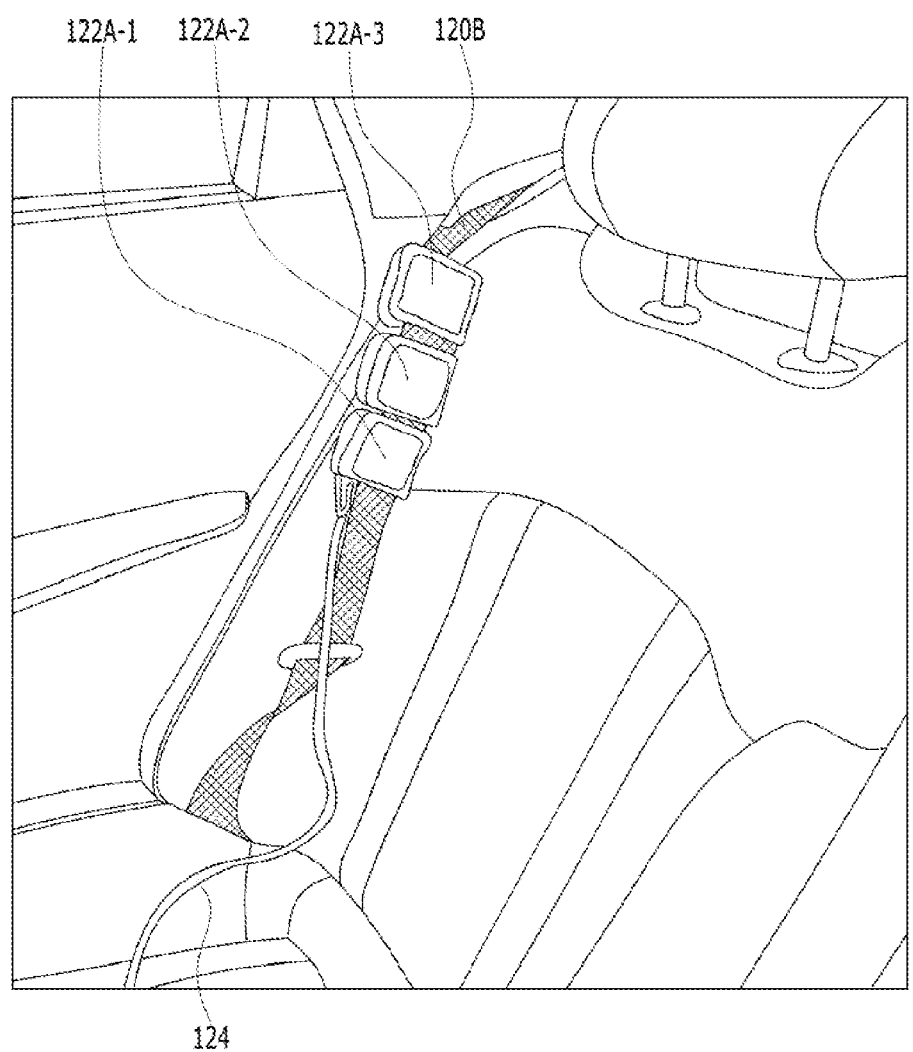
FIG. 8 is a perspective view showing the external appearance of first to third air pouches attached to the belt.

FIGS. 7A-7C are views illustrating the state in which the buckle 110 and the belt 120 are engaged with each other to secure an occupant 400. FIG. 8 is a perspective view showing the external appearance of the first to third air pouches 122A-1, 122A-2 and 122A-3 attached to the belt 120B. The belts 120B and 120C shown in FIGS. 7A to 7C and FIG. 8 are exemplary embodiments of the belts 120 and 120A shown in FIGS. 1 to 3.

As shown in FIG. 8, the first to third air pouches 122A-1, 122A-2 and 122A-3 may be arranged in series in the longitudinal direction of the belt 120B. As shown in FIGS. 7A-7C, the air pouch 122B may be disposed at the belt 120C. Further, the air pouches 122A-1, 122A-2, 122A-3 and 122B may be disposed at portions of the belts 120B and 120C with which the body of the occupant 400 comes into contact when the belts 120B and 120C are fastened to the buckle 110. Further, as shown in FIG. 8, the hydraulic belt tube 124 may have a flexible shape because it is disposed at the belt 120B, which is movable.

The air controller 130 may be configured to variously control ON/OFF operation of the selection signals CS11, CS12, CS13, CS2 and CS3, as shown in Table 1 above. For example, the air controller 130 may be configured to generate the selection signals CS11, CS12, CS13, CS2 and CS3 so that the first to $N^{th}$ air pouches 122A-1 to 122A-N inflate or deflate in a predetermined order. For example, first, as shown in FIG. 7A, the first and second air pouches 122A-1 and 122A-2 may deflate, and the third air pouch 122A-3 may inflate. Subsequently, as shown in FIG. 7B, the first and third air pouches 122A-1 and 122A-3 may deflate, and the second air pouch 122A-2 may inflate. Subsequently, as shown in FIG. 7C, the second and third air pouches 122A-2 and 122A-3 may deflate, and the first air pouch 122A-1 may inflate. Accordingly, the air controller 130 may be configured to generate the selection signals CS11, CS12, CS13, CS2 and CS3 so that the third to first air pouches 122A-3, 122A-2 and 122A-1 sequentially inflate.

Alternatively, the air controller 130 (130A) may be configured to generate the selection signals CS11, CS12, CS13, CS2 and CS3 to guide control of the heart rate of the occupant. For example, the selection signals CS11, CS12, CS13, CS2 and CS3 may be generated so that the air pouch 122 (122A) repeatedly inflates and deflates in conjunction with the deep breathing cycle of the occupant, thereby inducing the occupant to breathe in accordance with the tactile feedback pattern and thus to naturally take a deep breath.

The vehicular belt tactile apparatus according to the exemplary embodiment described above may also be applied to various transportation apparatuses, such as airplanes, other than vehicles, and may also be applied to belts that contact the body of a user who exercises, works in an office, or walks.

Figure 9:
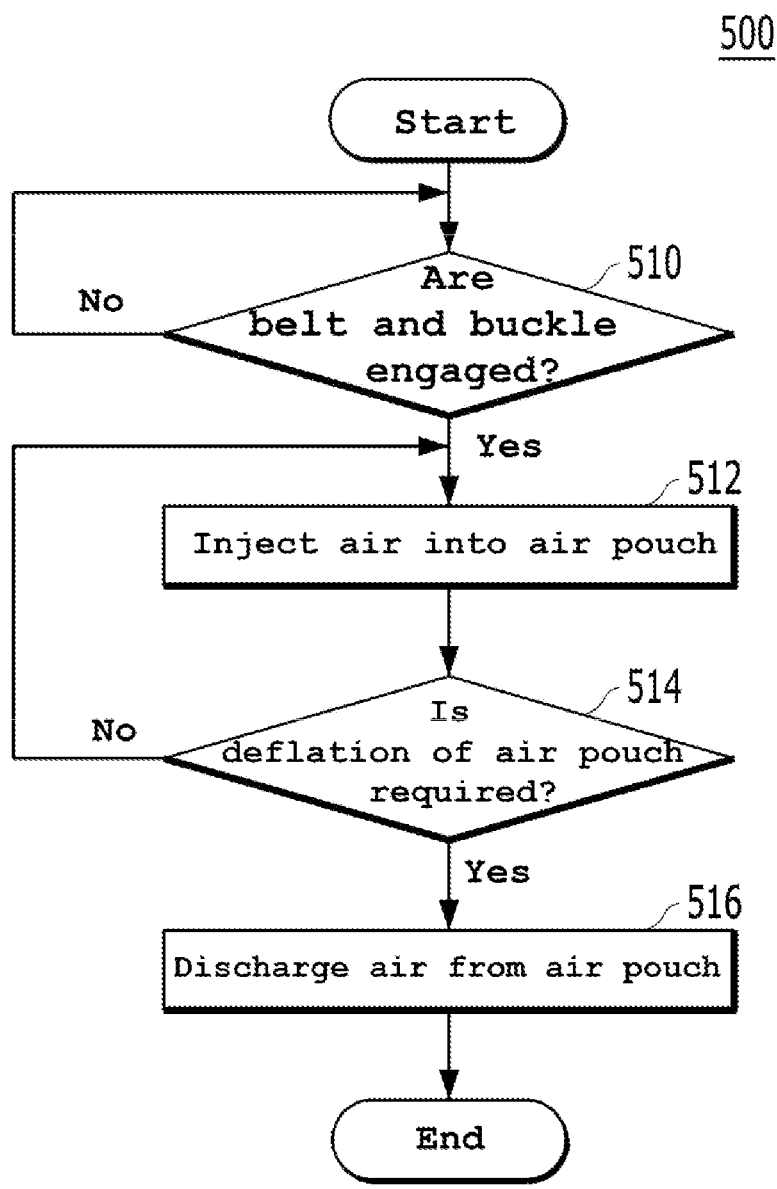
FIG. 9 is a flowchart of a method of controlling the vehicular belt tactile apparatus according to an exemplary embodiment.

Hereinafter, a method of controlling the vehicular belt tactile apparatus according to an exemplary embodiment will be described with reference to the accompanying drawings. FIG. 9 is a flowchart of a method 500 of controlling the vehicular belt tactile apparatus according to an exemplary embodiment.

Although the method 500 shown in FIG. 9 will be described as being performed by the air controller 130 described above, the exemplary embodiment is not limited thereto. Further, the method shown in FIG. 9 may operate the vehicular belt tactile apparatus 100 according to the exemplary embodiment described above. First, whether the belt 120 and the buckle 110 are engaged with each other is checked (step 510). For example, step 510 may be performed using the result of sensing by the sensing unit 140.

In response to determining that the belt 120 and the buckle 110 are engaged with each other, air may be injected into the air pouch 122 from the air supply unit 112 through the belt 120, thereby inflating the air pouch 122 (step 512). After step 512, whether deflation of the air pouch 122 is required may be checked (step 514). In response to determining that deflation of the air pouch 122 is required, air discharged from the air pouch 122 via the belt 120 may be discharged to the outside through the air supply unit 112, thereby deflating the air pouch 122 (step 516).

Hereinafter, a vehicular belt tactile apparatus according to a comparative example and the vehicular belt tactile apparatus according to the exemplary embodiment will be described with reference to the accompanying drawings.

In the case of the vehicular belt tactile apparatus according to the comparative example, an air supply unit (corresponding to 112 of the embodiment) is disposed at a belt (corresponding to 120 of the embodiment) together with an air pouch (corresponding to 122 of the embodiment). Further, a motor of an air pump (corresponding to 210 of the embodiment), which is disposed in the air supply unit to pump air, is also disposed at the belt. In particular, in the event of a vehicle crash, there is a risk of injury to an occupant caused by fragments of the motor and the solenoid valve of the air pump.

In contrast, in the case of the vehicular belt tactile apparatus according to the embodiment, the air supply unit 112 is disposed at the buckle 110, which is a fixed part, rather than the belt 120, which is a movable part, and the air pouch 122 is disposed at the belt 120. Accordingly, in the event of a vehicle collision, the risk of injury to the occupant 400 attributable to the weight of the air supply unit and fragments of the air pump 210 and the air valve 220 may be eliminated or minimized.

Further, in the case of the vehicular belt tactile apparatus according to the comparative example, external power is used to drive the motor of the air pump (which performs the role of 210 of the embodiment) to increase the degree of freedom of installation of components. Therefore, when the belt tactile apparatus according to the comparative example is applied to a vehicle, it is required to replace a battery of the vehicle in order to supply external power.

In contrast, the vehicular belt tactile apparatus according to the exemplary embodiment may not use external power in order to drive the motor of the air pump 210. The reason for this is that the power of the vehicle may be supplied to the buckle, which is fixed to the vehicle, since the air pump 210 is disposed inside the buckle 110. Accordingly, when the belt tactile apparatus according to the exemplary embodiment is applied to a vehicle, it is not necessary to replace a battery of the vehicle to supply external power.

Further, in the case of the belt tactile apparatus according to the comparative example, a user needs to manually control inflation or deflation of the air pouch irrespective of engagement or disengagement of the buckle and the belt. In contrast, in the case of the belt tactile apparatus according to the exemplary embodiment, when the belt 120 is engaged with the buckle 110, the sensing unit 140 may be configured to sense the engagement and transmits the result of sensing to the air controller 130, and the air controller 130 may be configured to inject air into the air pouch 122 without intervention by the user, thereby improving user convenience.

These days, a motor tactile apparatus and a pneumatic-based tactile apparatus are the tactile apparatuses that are mainly used for vehicles. A motor tactile apparatus provides vibration feedback at a high response speed, transmits tactile information in point units to accurate positions, and effectively gives travel information or a warning to an occupant (particularly a driver). However, there is a limitation in reduction in stress of the occupant due to the somewhat sharp tactile characteristics thereof. On the other hand, a pneumatic-based tactile apparatus gives a warning to a driver using soft tactile feedback in surface units, thereby not interrupting the driver's concentration.

The belt tactile apparatus according to the exemplary embodiment is a pneumatic-based tactile apparatus that provides a tactile sensation to an occupant by injecting air into the air pouch 122. Accordingly, compared to a motor tactile apparatus, the belt tactile apparatus according to the exemplary embodiment is capable of providing a soft tactile sensation in surface units to the occupant and of providing a feeling of hugging to the occupant when the occupant fastens a seat belt. Further, the belt tactile apparatus according to the exemplary embodiment is capable of providing a massage function to the occupant, thereby relieving the stress and tension of the occupant. Furthermore, in the case of the embodiment, when the belt 120 is fastened to the buckle 110, air is immediately injected into the air pouch 122 without intervention on the part of the user, so it may be possible to overcome the problem of the relatively low response speed of a pneumatic-based tactile apparatus compared to a motor tactile apparatus.

In addition, the belt tactile apparatus according to the exemplary embodiment is capable of generating the selection signals CS11, CS12, CS13, CS2 and CS3 so that the air pouch 122 repeatedly inflates and deflates in conjunction with the deep breathing cycle of the occupant, thereby guiding control of the heart rate of the occupant.

As is apparent from the above description, the vehicular belt tactile apparatus and the method of controlling the same according to the exemplary embodiments are capable of preventing or minimizing the risk of injury to an occupant attributable to the weight of the air supply unit and fragments of the air pump and the air valve in the event of a vehicle crash. It is not necessary to replace a battery of the vehicle to supply external power, and user convenience may be improved. It may be possible to provide a soft tactile sensation in surface units to the occupant and to provide a feeling of hugging to the occupant when the occupant fastens a seat belt.

Further, it may be possible to provide a massage function to the occupant, thereby relieving the stress and tension of the occupant. Furthermore, it may be possible to overcome the problem of the relatively low response speed of a pneumatic-based tactile apparatus compared to a motor tactile apparatus. Additionally, it may be possible to control the air pouch to repeatedly inflate and deflate in conjunction with the deep breathing cycle of the occupant, thereby guiding control of the heart rate of the occupant.

However, the effects achievable through the disclosure are not limited to the above-mentioned effects, and other effects not mentioned herein will be clearly understood by those skilled in the art from the above description. The above-described various embodiments may be combined with each

What is claimed is:

1. A vehicular belt tactile apparatus, comprising:
a buckle;
a belt configured to be fastened to the buckle;
at least one air pouch disposed at a portion of the belt that contacts a body of an occupant when the belt is fastened to the buckle; and
an air controller configured to generate a control signal when the belt is fastened to the buckle,
wherein the buckle includes an air supply unit configured to inject air into the at least one air pouch through the belt or to discharge air from the at least one air pouch in response to the control signal;
wherein the air supply unit includes:
a hydraulic buckle tube connected to the belt;
an air valve configured to inject air into the hydraulic buckle tube or to discharge air from the hydraulic buckle tube in response to selection signals; and
an air pump configured to pump and supply required air to the air valve,
wherein the air controller is configured to determine whether inflation or deflation of the at least one air pouch is required, generate the selection signals in response to a result of determination. and operate the air pump, and
wherein the air valve includes:
a first air valve configured to inject air into the hydraulic buckle tube or to receive air discharged from the hydraulic buckle tube in response to a first selection signal, the first selection signal being a first of the selection signals;
a second air valve configured to supply air pumped by the air pump to the first air valve or to discharge the pumped air to an outside in response to a second selection signal, the second selection signal being a second of the selection signals; and
a third air valve configured to suction external air and supply the external air to the air pump or to supply air discharged from the first air valve to the air pump in response to a third selection signal, the third selection signal being a third of the selection signals.

2. The vehicular belt tactile apparatus according to claim 1, wherein the belt includes a hydraulic belt tube having a first end portion, communicating with the hydraulic buckle tube when fastened to the buckle, and a second end portion, communicating with the at least one air pouch.

3. The vehicular belt tactile apparatus according to claim 2, wherein each of the first air valve, the second air valve, and the third air valve is a solenoid valve.

4. The vehicular belt tactile apparatus according to claim 2, wherein the at least one air pouch includes first to $N^{th}$ air pouches arranged in a longitudinal direction of the belt,
wherein the hydraulic buckle tube includes first to $N^{th}$ hydraulic buckle tubes,
wherein the hydraulic belt tube includes first to $N^{th}$ hydraulic belt tubes,
wherein the first air valve includes $1\text{-}1^{st}$ to $1\text{-}N^{th}$ air valves,
wherein an $n^{th}$ ($1 \leq n \leq N$) hydraulic belt tube is disposed between an $n^{th}$ hydraulic buckle tube and an $n^{th}$ air pouch, and
wherein a $1\text{-}n^{th}$ air valve is connected to each of the $n^{th}$ hydraulic buckle tube, the second air valve, and the third air valve.

5. The vehicular belt tactile apparatus according to claim 4, wherein the air controller is configured to generate the first to third selection signals so that the first to $N^{th}$ air pouches inflate or deflate in a predetermined order.

6. The vehicular belt tactile apparatus according to claim 4, wherein the air controller is configured to generate the first to third selection signals to guide control of a heart rate of the occupant.

7. The vehicular belt tactile apparatus according to claim 1, further comprising:
a sensor configured to sense engagement or disengagement of the belt and the buckle,
wherein the air controller is configured to generate the control signal in response to a result of sensing by the sensor.

8. A method of controlling a vehicular belt tactile apparatus including a buckle comprising an air supply unit, a belt configured to be fastened to the buckle, and at least one air pouch disposed at a portion of the belt that contacts a body of an occupant when the belt is fastened to the buckle, the method comprising:
determining, by a controller, whether the belt has been fastened to the buckle;
in response to determining, by the controller, that the belt has been fastened to the buckle, injecting air into the at least one air pouch from the air supply unit through the belt to inflate the at least one air pouch;
determining, by the controller, whether deflation of the at least one air pouch is required; and
in response to determining, by the controller, that deflation of the at least one air pouch is required, discharging air discharged from the at least one air pouch via the belt to an outside through the air supply unit to deflate the at least one air pouch;
wherein the air supply unit includes:
a hydraulic buckle tube connected to the belt;
an air valve configured to inject air into the hydraulic buckle tube or to discharge air from the hydraulic buckle tube in response to selection signals, the selection signals being generated in response to a result of determining whether inflation or deflation of the at least one air pouch is required; and
an air pump configured to pump and supply required air to the air valve, the air pump being operated by the selection signals,
wherein the air valve includes:
a first air valve configured to inject air into the hydraulic buckle tube or to receive air discharged from the hydraulic buckle tube in response to a first selection signal, the first selection signal being a first of the selection signals;

a second air valve configured to supply air pumped by the air pump to the first air valve or to discharge the pumped air to an outside in response to a second selection signal, the second selection signal being a second of the selection signals; and a third air valve configured to suction external air and supply the external air to the air pump or to supply air discharged from the first air valve to the air pump in response to a third selection signal, the third selection signal being a third of the selection signals.

* * * * *